3,829,402
PROCESS FOR THE PREPARATION OF COMPOSITIONS COMPRISING POLYVINYL ALCOHOL AND A FINELY DISPERSED SOLID

Johann Wolfgang Zimmermann, Frankfurt am Main, Germany, assignor to Farbwerke Hoechst Aktiengesellschaft vormals Meister Lucius & Bruning, Frankfurt am Main, Germany
No Drawing. Filed Jan. 5, 1973, Ser. No. 321,216
Claims priority, application Germany, Jan. 5, 1972, P 22 00 321.0
Int. Cl. C08f 45/04
U.S. Cl. 260—42.13                                    4 Claims

ABSTRACT OF THE DISCLOSURE

A process for the preparation of compositions of polyvinyl alcohol and finely dispersed solids is provided by subjecting a polyvinyl ester to hydrolysis or alcoholysis in the presence of a finely dispersed solid and an acid or alkaline catalyst, removing the solvents and drying the resulting composition.

---

The present invention relates to a process for the preparation of compositions comprising polyvinyl alcohol and a finely dispersed solid by hydrolysis or alcoholysis of polyvinyl esters in the presence of inert or reactive solids of small particle size with subsequent removal of the solvents.

In industry polyvinyl alcohol is mainly used in the form of its aqueous solution. Suspensions of pigments or other powdery solids in aqueous polyvinyl alcohol solutions have been prepared, up to now, by mixing a polyvinyl alcohol solution with the powdery solid. After the addition of further adjuvants, suspensions of this type are used, for example, as paper coating composition. They may also be used as paints, but in this field distempers containing cellulose ether as a binder are preferred as they can be mixed with cold water, whereas polyvinyl alcohol generally has to be dissolved at higher temperatures.

When used as a binder for ceramic masses polyvinyl alcohol is mixed with the raw powder to be burnt or sprayed onto same in the form of its aqueous solution.

Dry powders for water-hardening cements, building adhesives and putties on the basis of cement, lime or gypsum plaster with an addition of polyvinyl alcohol can be prepared by mixing the dry components, but the dispersion of the polyvinyl alcohol in the mixture, especially when the alcohol is used in its normal granular form, is not satisfactory and when water is added to the mixture the polyvinyl alcohol will not dissolve completely within the setting period. Since the above-mentioned binders harden on addition of water coating of the finely dispersed binders with polyvinyl alcohol by using an aqueous solution of the same to achieve a better distribution is not practicable.

The present invention provides a process for the preparation of compositions of polyvinyl alcohol and finely dispersed solids, e.g. inert or reactive pigments or fillers, which comprises subjecting a polyvinyl ester to an ester interchange reaction with an alcohol in the presence of the solids, removing the excess alcohol and the ester formed as a by-product, and drying the composition obtained.

Polyvinyl esters which may be used in the process of the invention are polyvinyl esters of straight chain or branched aliphatic monocarboxylic acids having 1 to 18 carbon atoms, preferably the esters of the lower aliphatic fatty acids having from 1 to 4 carbon atoms such as polyvinyl formate, polyvinyl acetate, or polyvinyl propionate, preferably polyvinyl acetate. There may also be used copolymers of different vinyl esters or of vinyl esters with other $\alpha,\beta$-ethylenically unsaturated monomers. Such monomers are, for example, acrylic acid or methacrylic acid as well as their esters; maleic acid, fumaric acid, or crotonic acid and the esters thereof; styrene and its homologs; vinyl chloride, vinylidene chloride, acrylonitrile, or ethylene.

The ester interchange reaction is carried out in a known manner using low molecular weight aliphatic alcohols having 1 to 4 carbon atoms, for example methanol, ethanol, isopropanol, preferably methanol. Suitable ester interchange catalysts are acid catalysts such as sulfuric acid, hydrochloric acid, or p-toluene-sulfonic acid, as well as basic catalysts such as alkali metal or alkaline earth metal alcoxides alkali metal or alkaline earth metal hydroxides, preferably the sodium compounds.

The reaction is carried out at a temperature in the range of from 0° C. to the boiling point of the alcohol used, preferably of from 20 to 65° C. It is expedient to work at atmospheric pressure, but working under reduced or elevated pressures up to about 6 atmospheres gauge is also possible.

The alcohol used for the ester interchange reaction simultaneously serves as a solvent for the polyvinyl ester. To control the reaction or to improve the solubility other solvents may be added, for example water or low-boiling esters such as methyl acetate or ethyl acetate. If a finely dispersed solid is present that will react with water, of course no water must be added during the process.

The finely dispersed solids to be use in the process of the invention practically comprise all powdery substances which are inert under the conditions of the ester interchange reaction. There may be mentioned, inorganic pigments, for example titanium dioxide, carbon black, iron oxides, lead chromate, zinc sulfide; organic pigments, for example azo pigments, phthalocyanine or quinacridone dyestuffs; fillers such as barium sulfate (heavy spar) calcium sulfate (light spar), calcium carbonate (whiting), China clay (kaolin), magnesium silicate (talcum), finely dispersed silica, powdered asbestos, or milled slate; binder such as cement, lime or gypsum plaster; water-soluble salts, for example sodium chloride, ammonium sulfate, potassium sulfate; furthermore fertilizers, powdery pharmaceuticals, pesticides, or herbicides, which may be coated with polyvinyl alcohol for extending their activity.

The process of the invention is carried out either discontinuously in a vessel provided with a stirrer or in a kneader or continuously in an extruder or on a conveyer belt, in much the same manner as the known processes for preparing polyvinyl alcohol. The excess alcohol used for the ester interchange and the ester formed as a by-product are separated and preferably recovered.

The small amounts of catalyst remaining in the final product, i.e. the dry powder, do not affect the properties of the same. If desired, the powder, can be further processed into bricks, tablets or granules, the polyvinyl alcohol then acting as an excellent adhesive or binding agent.

The proportion of polyvinyl alcohol in the compositions of the invention comprising polyvinyl alcohol and a finely dispersed solid is in the range of from 0.5 to 20%, preferably 2 to 10% by weight. The required amount of polyvinyl ester is calculated by the reaction equation

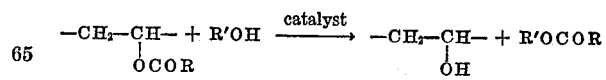

from the ratio of the molecular weights of the structural units, of the polyvinyl derivative, for example 86 for polyvinyl acetate and 44 for polyvinyl alcohol. The amount of alcohol used as a solvent and ester interchange agent is preferably chosen in such a manner that the suspension can be easily stirred.

According to the process of the invention there are obtained polyvinyl alcohol containing pigment or filler powders on which the polyvinyl alcohol is finely distributed so that it dissolves substantially when the powder is mixed with cold water. It is thus possible to produce paints that are similar to distempers but have a much higher abrasion resistance due to the high pigment binding power of the polyvinyl alcohol at the same binder level. Water colors can also be prepared by the process of the invention. A further advantage of the compositions of the invention resides in the fact that a so-called "pigment shock" which occurs when polyvinyl alcohol solutions are added to certain pigments that are used in paper coating compositions, for example China clay or satin white, and which manifests itself in an undesired sudden thickening of the mixture is not observed with the pigment compositions of the invention.

According to the present invention the binders cement, lime and gypsum plaster can be intimately mixed with polyvinyl alcohol in an extremely fine state of distribution and after hardening of the composition shaped articles having a good strength and a high resistance to abrasion are obtained. Plaster compositions according to the invention can also be used for making plaster bandages or plaster casts in orthopaedics. These bandages have the advantage that they show little dusting before use, harden rapidly and after hardening have a good abrasion resistance. Compositions of fertilizer salts and polyvinyl alcohol have a delayed dissolution rate in water so that fertilizers with long-time activity are obtained.

The following examples illustrate the invention.

EXAMPLE 1

Preparation of a polyvinyl alcohol-gypsum plaster composition

In a reaction vessel the following components were mixed in the indicated order:

331.0 parts by weight of gypsum plaster
25.0 parts by weight of a polyvinyl acetate solution of 54% strength by weight in methanol, a 10% by weight solution of the polymer in methanol having a viscosity of 3.0 to 3.2 cp. as measured in the Höppler viscometer
5.4 parts by weight of sodium methoxide suspended in 49.0 parts by weight of methanol

Procedure (a)

Immediately after mixing a gauze bandage was impregnated with the composition obtained and squeezed between a pair of rollers. The bandage thus treated was kept in a closed container while moist with solvent for about 1 hour and then dried at 80 to 100° C.

A plaster bandage of high abrasion resistance was obtained supporting the dried composition containing 2% by weight of polyvinyl alcohol. By short immersion in water the gypsum plaster was activated and the flexible bandage having a pH value of about 7 was ready for application. After water setting of the gypsum plaster the bandage became hard and rigid and did not soften upon the action of water.

Procedure (b)

The composition specified above was stirred for 1 hour and by indirect heating of the reaction vessel at 80–90° C. the solvent was then distilled off while stirring. The remaining white powder contained 2% by weight of polyvinyl alcohol.

As compared with the gypsum plaster used as starting material the gypsum plaster-polyvinyl alcohol composition obtained could be mixed with water equally fast, it had a better plasticity in the pasty state, an improved adhesive strength, for example on asbestos cement, concrete, and wood, and in the hardened state it had an improved surface hardness and a better resistance to scratching after a 24 hour storage of the test specimens in water.

EXAMPLE 2

Preparation of a polyvinyl alcohol-calcium hydroxide composition for use as a lime color (whitewash)

(a) A mixture was prepared from 800.0 parts by weight of calcium hydroxide
22.0 parts by weight of a polyvinyl acetate solution of 35% strength by weight in methanol, a 10% by weight solution of the polymer in methanol having a viscosity of 6 to 8 cp. as measured in the Höppler viscometer
500.0 parts by weight of methanol
6.0 parts by weight of sodium hydroxide solution of 10% strength by weight, prepared from a 40% aqueous sodium hydroxide solution by dilution with methanol.

The mixture was stirred for 1 hour at room temperature and the solvents were subsequently distilled off until the composition was dry. A fine, dry calcium hydroxide powder composition containing 0.5% by weight of polyvinyl alcohol was obtained.

(b) For comparison a lime color (whitewash) containing 0.5% by weight of methyl cellulose as a binder was prepared from 800.0 parts by weight of calcium hydroxide 100.0 parts by weight of a 4% aqueous solution of methyl cellulose having a viscosity of 150 to 230 cp., measured as a 2% aqueous solution in the Höppler viscometer
200.0 parts by weight of water to adjust ease of brushing The calcium hydroxide powder containing 0.5% by weight of polyvinyl alcohol according to (a) was mixed with the required amount of cold water to give a workable paint and applied to asbestos cement boards. The comparative lime color (b) having the same binder content was applied to boards of the same type and after drying of the paints and storing in air rich in carbon dioxide the paint containing polyvinyl alcohol was found to have the better abrasion resistance.

EXAMPLE 3

Preparation of a polyvinyl alcohol-whiting composition for use as a abrasion-resistant distemper (a) The following components were mixed in the indicated order and allowed to react for 1 hour while stirring:

360.0 parts by weight of whiting
140.0 parts by weight of methanol
110.0 parts by weight of a polyvinyl acetate solution as described in Example 2(a)
33.0 parts by weight of sodium hydroxide solution as described in Example 2(a).

After having distilled off the solvents a dry powder containing 5.5% by weight of polyvinyl alcohol was obtained.

(b) Comparative example 360.0 parts by weight of whiting were suspended in
140.0 parts by weight of water and mixed with
500.0 parts by weight of an aqueous solution of methyl cellulose as described in Example 2(b).

The powder according to (a) containing polyvinyl alcohol was mixed with the required amount of cold water and gave a workable distemper which was immediately ready for use.

With both paints (a) and (b) asbestos cement boards were painted and the abrasion resistance of the dry paints was determined with a black linen cloth. Paint (a) containing polyvinyl alcohol as a binder showed a good resistance whereas paint (b) containing the same amount of a conventional binder was poor.

EXAMPLE 4

Preparation of a polyvinyl alcohol-cement composition 3,000.0 parts by weight of Portland cement type 275
222.0 parts by weight of a polyvinyl acetate solution of 54% strength by weight in methanol as described in Example 1
3.2 parts by weight of sodium methoxide suspended in 500.0 parts by weight of methanol were stirred for 1 hour at room temperature and worked up to yield a dry powder as described in the preceding examples.

EXAMPLE 5

Preparation of a composition for use as a putty 150.0 parts by weight of methanol
550.0 parts by weight of powdered barium sulfate
200.0 parts by weight of whiting
105.0 parts by weight of a polyvinyl acetate solution of 23% strength by weight in methanol, a 10% by weight solution of the polymer in methanol having a viscosity of 15 cp. as measured in the Höppler viscometer
13.2 parts by weight of a solution of 3.2 parts by weight of a 40% aqueous sodium hydroxide solution in 10 parts by weight of methanol were stirred for 1 hour at 30° C. and worked up to yield a dry powder by distilling off the solvent.

EXAMPLE 6

Preparation of a polyvinyl alcohol-China clay composition for use as a paper coating composition 2,000.0 parts by weight of China clay of the type SPS
750.0 parts by weight of a solution of 17% strength by weight of polyvinyl acetate in methanol, a 10% by weight solution of the polymer in methanol having a viscosity of 18 cp. as measured in the Höppler viscometer
1,220.0 parts by weight of methanol
36.0 parts by weight of a 40% aqueous sodium hydroxide solution diluted with methanol to a strength of 10% by weight were stirred for 2 hours at 30° C. and worked up to yield a dry powder by distilling off the solvent. The dry powdery mixture contained 3.1% of polyvinyl alcohol as a binder. When mixed with water no pigment shock was observed. Upon heating the aqueous mixture a smooth paper coating composition was obtained.

EXAMPLE 7

Preparation of a polyvinyl alcohol-ammonium sulfate composition for use as a fertilizer with prolonged activity 250.0 parts by weight of ammonium sulfate
185.0 parts by weight of a 30% by weight methanolic solution of a copolymer of 70% by weight of vinyl acetate and 30% by weight of dibutyl maleate, a 20% by weight solution of the polymer in ethyl acetate having a viscosity of 10 cp. as measured in the Höppler viscometer
2.0 parts by weight of p-toluene-sulfonic acid dissolved in 200.0 parts of methanol were mixed and the mixture stirred for 16 hours at 55° C. A dry granular fertilizer was obtained after distillation and recovery of the solvents.

The dissolution rate of this composition was much lower than that of pure ammonium sulfate.

What is claimed is:

1. A process for the preparation of a composition comprising of polyvinyl alcohol and a finely dispersed solid from 99.5 to 80% by weight of said solid and of 0.5 to 20% by weight of polyvinyl alcohol, based on polyvinyl alcohol and said solid, which comprises subjecting a polyvinyl ester to an ester interchange reaction with an alcohol in admixture with the finely dispersed solid in the defined proportions, removing the excess alcohol and the ester formed as a by-product, and drying the composition so obtained.

2. A process as claimed in claim 1, wherein an inert or reactive pigment or filler is used as a solid.

3. A process as claimed in claim 1 wherein gypsum plaster is used as a solid.

4. In the process for dispersing polyvinyl alcohol in an intimate contact with a finely dispersed solid material the improvement comprising, admixing from 0.5 to 20% by weight of a polyvinyl ester to 99.5 to 80% by weight of said finely dispersed solid, said percent by weight being based on total weight of said solid and polyvinyl ester calculated as polyvinyl alcohol, subjecting said polyvinyl ester to an ester interchange reaction with said alcohol, removing the excess alcohol from said ester interchange and the ester formed as a by-product reaction and drying the polyvinyl alcohol and solid composition so obtained.

References Cited

UNITED STATES PATENTS

| | | | |
|---|---|---|---|
| 3,679,647 | 7/1972 | Bristol | 260—89.1 |
| 3,487,061 | 12/1969 | Bristol | 260—89.1 |
| 3,487,060 | 12/1969 | Bristol | 260—89.1 |
| 3,208,984 | 9/1965 | Dekking | 260—89.1 |
| 3,287,313 | 11/1966 | Imoto | 260—29.6 BE |
| 2,614,087 | 10/1952 | Turnbull | 260—33.4 R |

ALLAN LIEBERMAN, Primary Examiner

P. R. MICHL, Assistant Examiner

U.S. Cl. X.R.

260—33.4 R, 34.2, 42.55, 42.51